United States Patent [19]
Imbus et al.

[11] Patent Number: 5,956,830
[45] Date of Patent: Sep. 28, 1999

[54] O-RING ASSEMBLY TOOL

[75] Inventors: Donald B. Imbus, Hilliard; Christopher L. Fleece, Columbus, both of Ohio

[73] Assignee: Parker-Hannifin Corporation, Cleveland, Ohio

[21] Appl. No.: 08/984,291

[22] Filed: Dec. 3, 1997

[51] Int. Cl.⁶ .................................................. B23P 11/02
[52] U.S. Cl. ............................... 29/235; 29/229; 29/270; 29/451
[58] Field of Search .................. 29/235, 229, 270, 29/450, 451, 453

[56] References Cited

U.S. PATENT DOCUMENTS

| | | |
|---|---|---|
| 473,008 | 4/1892 | Lynch . |
| 705,564 | 7/1902 | Dorman . |
| 2,357,139 | 8/1944 | Seme ............................................. 29/235 |
| 2,438,642 | 3/1948 | Martin . |
| 2,510,206 | 6/1950 | Barkan et al. ............................ 29/235 |
| 2,647,556 | 8/1953 | Courtney .................................... 154/41 |
| 2,840,892 | 7/1958 | Erdmann . |
| 2,944,334 | 7/1960 | Arrighini et al. . |
| 3,149,413 | 9/1964 | Baskell ...................................... 29/235 |
| 3,180,015 | 4/1965 | Thompson et al. . |
| 3,263,318 | 8/1966 | Merrill ....................................... 29/235 |
| 3,289,286 | 12/1966 | Belanger . |
| 3,553,817 | 1/1971 | Lallak . |
| 3,694,894 | 10/1972 | Jelinek et al. . |
| 3,704,505 | 12/1972 | Lacer, Jr. et al. ....................... 29/235 |
| 3,940,845 | 3/1976 | Czerwiak . |
| 3,981,066 | 9/1976 | Calvert . |
| 4,141,129 | 2/1979 | Martini ..................................... 29/235 |
| 4,183,132 | 1/1980 | Nagashima et al. . |
| 4,203,191 | 5/1980 | Gibson, Sr. .............................. 29/235 |
| 4,222,161 | 9/1980 | Duval et al. . |
| 4,519,636 | 5/1985 | Tomlin et al. . |
| 4,571,804 | 2/1986 | Grabler et al. . |
| 4,765,048 | 8/1988 | Hokanson ................................ 29/235 |
| 4,845,822 | 7/1989 | Hutson .................................... 29/235 |
| 5,050,282 | 9/1991 | Zannini . |
| 5,138,752 | 8/1992 | Tasner ..................................... 29/235 |
| 5,564,177 | 10/1996 | Fernandes et al. . |
| 5,577,314 | 11/1996 | Katsuno et al. . |

FOREIGN PATENT DOCUMENTS

| | | | |
|---|---|---|---|
| 0137907 | 4/1985 | European Pat. Off. . | |
| 2649-349 | 1/1991 | France ................................. | 29/235 |
| 2161562 | 6/1973 | Germany ............................. | 29/235 |
| 57-15644 | 1/1982 | Japan .................................... | 29/229 |
| 59-196133 | 11/1984 | Japan .................................... | 29/229 |
| 4-175578 | of 1992 | Japan . | |
| 6-114645 | 4/1994 | Japan ................................... | 29/453 |
| 595-112 | 2/1978 | U.S.S.R. ............................... | 29/235 |
| 716-772 | 2/1980 | U.S.S.R. ............................... | 29/235 |
| 904-974 | 2/1982 | U.S.S.R. ............................... | 29/235 |
| 1117-179 | 10/1984 | U.S.S.R. ............................... | 29/229 |
| 642994 | 9/1950 | United Kingdom ................. | 29/229 |
| 667935 | 3/1952 | United Kingdom ................. | 29/229 |
| WO 98/41364 | 9/1998 | WIPO . | |

*Primary Examiner*—David P. Bryant
*Assistant Examiner*—John Preta
*Attorney, Agent, or Firm*—Christopher H. Hunter

[57] ABSTRACT

An O-ring assembly tool for locating an O-ring within a groove formed in the end surface of a fitting includes a plunger having a cylindrical body with an end wall. A locator hub with a cylindrical body closely receives the cylindrical body of the plunger. A compression spring biases the plunger rearwardly within the locator hub, while a retaining pin allows axial forward movement of the plunger, but prevents relative rotation with respect to the locator hub. The locator hub includes an enlarged receiving end which axially and radially locates the assembly tool with respect to an end fitting. The cylindrical body of the plunger includes a flat annular engagement surface and when the plunger is pushed forwardly, the engagement surface pushes an O-ring forwardly into the groove on the end face of the fitting. The locator hub has a tapered inner surface at its forward end which radially-inwardly compresses the O-ring to fit cleanly within the groove.

24 Claims, 4 Drawing Sheets

O-RING ASSEMBLY TOOL

FIELD OF THE INVENTION

The present invention relates generally to tools for assembling O-ring seals and other similar types of annular gaskets on a fitting.

BACKGROUND OF THE INVENTION

Certain types of fittings require an annular gasket located between the end surfaces of adjacent fittings to provide a leak-free connection. These fittings are generally referred to as "face seal" fittings. Elastomeric O-ring seals have received widespread acceptance as being appropriate for this application, as the seals are easily and inexpensively formed, generally conform to the adjacent surfaces, and can withstand a wide range of system pressures. The O-ring seal is received within a groove formed in the end surface of at least one of the fittings, and the fittings are assembled such that the seal is compressed against the end surface of the adjacent fitting. The pressure of fluid within the fitting acts against the seal ring to form a pressure seal against the opposing fitting surface.

Various groove designs in the fitting end face have been developed in an attempt to allow easy assembly of the seal in the groove, maintain proper orientation of the seal, and to prevent the seal from falling out of the groove as the fitting end faces are brought together. One common technique is to form an annular groove or channel with relatively straight cylindrical sidewalls and a flat annular end wall in the end surface of the fitting, and to locate the O-ring seal in this groove. Another groove design, commonly referred to as a half-dovetail groove, has one sidewall, typically the outer sidewall, tapered inwardly toward the other sidewall (i.e., toward the central axis of the fitting). The seal is radially compressed to fit over the dovetail portion of the groove, and expands when it is fully seated within the groove. Full dovetail grooves are also known, where both sidewalls taper inwardly toward each other and the seal cross section is similarly compressed when inserted into the groove and expands back to its original shape when the seal is fully seated within the groove.

Assembling an O-ring seal or other type of annular gasket within the above-described grooves can pose certain challenges. If the groove is merely a standard annular groove, the O-ring can be easily located within the groove by merely pushing the seal squarely against the fitting end surface. This type of groove however, can allow the O-ring to fall out when the fittings are separated, and so is not appropriate for certain applications. If the groove is a half-dovetail or full-dovetail groove, the O-ring must be compressed in some manner to initially locate the seal within the groove. While this type of groove retains the O-ring within the groove even if the fitting end faces are separated, care must be taken not to rip, twist or otherwise damage the O-ring along the groove during insertion. The assembly of O-rings in these types of grooves therefore has to be more carefully controlled.

Assembling an annular seal such as an O-ring into the above-described grooves can be accomplished by hand, in which case care can be taken in order to locate the O-ring in the groove without damaging the seal. However, such hand-assembly can be slow, labor-intensive and expensive. Certain tools have been developed in an attempt to provide a more automated technique for quickly and consistently locating a seal within a fitting groove. U.S. Pat. No. 3,981,066, for example, shows inner and outer annular members defining an annular funneled shoot, and an intermediate push ring which pushes the O-ring through the restricted opening defined between the sidewalls, where the O-ring can then expand into its normal shape when it is fully seated within the groove. The groove has a full dove-tail design. The tool has an inner annular shoulder which is received within the inner diameter of the seat ring to locate the tool with respect to the fitting.

Other assembly tools for locating an O-ring within an annular groove (non-dovetail design) include Japanese Patent Abstract No. 4-175578 and U.S. Pat. No. 3,289,286.

While the above tools might be appropriate for certain applications, it is believed that these tools can suffer certain drawbacks, and do not all provide a useful tool which is easily located over a fitting, has a minimum of movable parts, and can be quickly and consistently used to locate an O-ring within a groove without damaging the O-ring. The tools described above are also not designed specifically to locate O-rings in half dove-tail grooves, which account for a significant and expanding portion of the fitting market. Other tools are known for locating spring retaining rings and packing cord around a cylinder (such as the neck of a milk bottle), or a tube, however, it is believed these tools are generally inapplicable to face seal-type fittings of any type. As such, it is believed there is a demand in the industry for an O-ring assembly tool which overcomes the above-described drawbacks, and is particularly suited for locating O-rings in half-dove tail grooves.

SUMMARY OF THE PRESENT INVENTION

The present invention provides a novel and unique assembly tool for locating an O-ring within a groove in the end surface of a fitting. The tool is of simple construction, is easy to operate, and quickly and consistently positions an O-ring within a groove without damaging the O-ring. The tool is particularly useful for locating an O-ring in a half-dove tail groove within a fitting end face, although the tool can also be used to locate an O-ring within an annular groove.

According to the present invention, the assembly tool includes a cup-shaped plunger having a cylindrical body enclosed at its rear end by an end wall, and at the forward end defining a flat annular O-ring contact surface. A locator hub having a cylindrical body surrounds the plunger body in close sliding relationship. A compression spring is disposed between the end wall of the plunger and a rear end surface of the locator hub for biasing the plunger into a first, rearward position. A retaining pin or rivet extends radially inward from the outer locator hub into an axial slot along the plunger to allow forward axial movement of the plunger into a second position, but to prevent unintentional diassembly of the plunger and locator hub and rotation of the plunger with respect to the locator hub.

The locator hub includes an enlarged receiving end having an inner annular end wall for engaging the end surface of the fitting, and a cylindrical sidewall for closely receiving the outer diameter of the fitting (i.e., the threads on the fitting). The end wall of the enlarged receiving end has an inner diameter which is preferably slightly smaller than the outer diameter of the groove in the fitting. The outer surface at the forward end of the plunger tapers radially inward toward the central axis of the tool. The forward end of the locator hub likewise has an opposing, inner surface which tapers radially inward toward the central axis of the tool. The tapered surfaces are in adjacent contact when the plunger is moved against its spring bias into the second, forward position.

An O-ring to be assembled on a fitting is located within the cylindrical body of the locator hub at the forward end of the plunger. The O-ring in its normal state has an outer diameter about the same as the inner diameter of the cylindrical body of the locator hub. The enlarged receiving end of the locator hub is then located around the fitting, with the end surface of the fitting contacting the inner end wall of the receiving end, and the threads on the fitting closely held by the cylindrical sidewall of the receiving end. The enlarged receiving end of the locator hub properly aligns the assembly tool axially and radially with respect to the fitting. The plunger is then moved from its first, rearward position to its second, forward position, thereby pushing the O-ring into the groove in the fitting. The tapered inner surface of the locator hub radially inwardly compresses the diameter of the O-ring as the O-ring is moved forwardly by the plunger such that the O-ring can cleanly pass into the groove without catching on the outer dovetail edge of the groove, and without tearing, twisting or otherwise damaging the O-ring. When the O-ring is fully in the groove, the O-ring can then expand outwardly into the full dimension of the groove. The assembly tool can also be used to locate O-rings in annular grooves in end fittings in the same manner.

The assembly tool described above can be formed from any appropriate material, such as plastic or metal, using common manufacturing techniques. According to one form of the invention, particularly useful with a plastic assembly tool, the plunger includes an outer cylindrical sleeve which encloses the compression spring. To this end, the plunger includes inner and outer cylindrical wall portions and an annular end wall interconnecting the sidewalls and together with the sidewalls defining an annular, forwardly-opening cavity. The spring is disposed in the cavity, and the cylindrical body of the locator hub is then inserted into the cavity. Again, the spring normally biases the plunger into the first position with respect to the locator hub. The retaining pin extends through both the inner and outer cylindrical sidewalls of the plunger, and can be received with an axial slot in the locator hub to allow the plunger to be moved axially forwardly into the second position, but prevent rotation of the plunger with respect to the locator hub.

The assembly tool can also be incorporated into an automated process line. To this end, an arcuate slot is formed around the cylindrical body of the locator hub to allow O-rings to be successively radially loaded into the locator hub and against the plunger from an automatic feed device. An arrangement of assembly tools of various sizes can be supported on a rotating carousel and brought into alignment with successive fittings. An air piston can then be used to engage the plunger of the respective tool and move the plunger forwardly to push the O-ring into each successive fitting.

As such, the present invention provides an assembly tool for locating O-rings in a groove in the end of a fitting. The assembly tool is of simple construction, is easy to operate, and provides for quickly and consistently positioning an O-ring within a groove without damaging the O-ring.

Further features and advantages of the present invention will become apparent to those skilled in the art upon reviewing the following specification and attached drawings.

DETAILED DESCRIPTION OF THE PREFERRED EMBODIMENT

Figure 1:
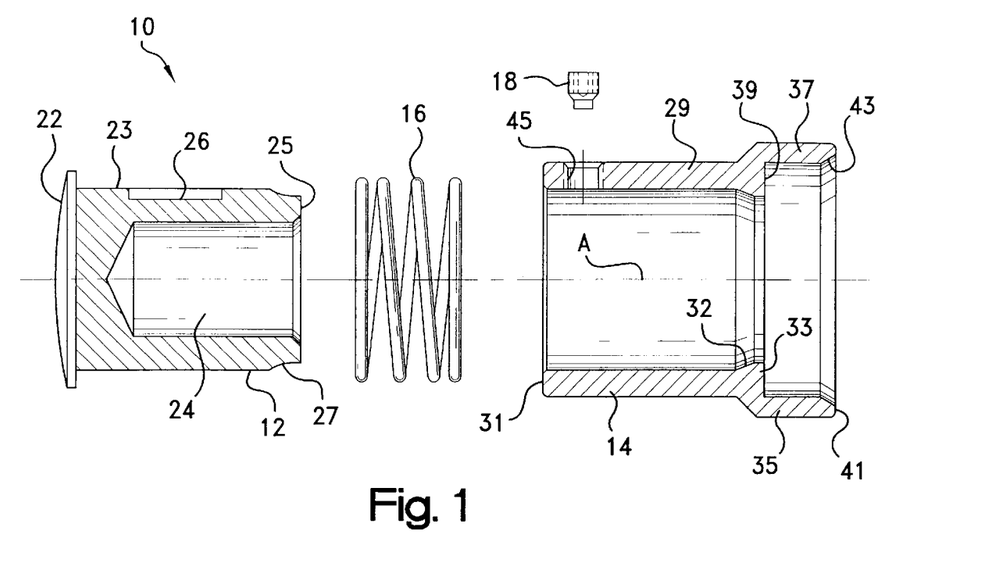
FIG. 1 is an exploded perspective view of an assembly tool constructed according to the principles of the present invention for installing an O-ring on an end fitting.

Referring to the drawings and initially to FIG. 1, an assembly tool constructed according to the principles of the present invention is indicated generally at 10. The assembly tool includes a plunger 12, a locator hub 14, a compression spring 16 for biasing the locator hub, and a retaining pin 18 for retaining the locator hub 14 within plunger 12.

Plunger 12 has a cup-shaped body which includes an end wall 22 and a cylindrical body 23 which define an inner cavity, indicated at 24. End wall 22 encloses the rear end of cylindrical body 23 and extends radially outward therefrom, while the forward end of the cylindrical body defines an annular contact surface 25. An axial slot 26 is formed in the exterior surface of body 23, and extends along a portion of the surface. An outer surface portion 27 at the forward end of the cylindrical body 23 preferably tapers or narrows radially inwardly toward the central axis "A" of the tool.

Locator hub 14 includes a cylindrical body 29 having a first (rearward) end 31 and a second (forward) end 33. An inner surface portion 32 at the forward end of the cylindrical body 29 also tapers or narrows radially inwardly toward the central axis "A" of the tool. The taper of the cylindrical body 29 of locator hub 14 generally corresponds to the taper of the cylindrical body 23 of plunger 12. The locator hub also includes an enlarged end 35, which extends forwardly of cylindrical body 29 and defines a receptacle for receiving a fitting. Enlarged end 35 includes a cylindrical wall 37 with a smooth and continuous inner surface. The enlarged end also includes a flat annular end wall 39, extending substantially perpendicular to cylindrical wall 37, that is, perpendicular to the axis "A" of the tool. Cylindrical wall 37 extends outwardly from the periphery of end wall 39 to an annular open end 41. A tapered annular wall surface 43 is provided around open end 41.

Figure 2:
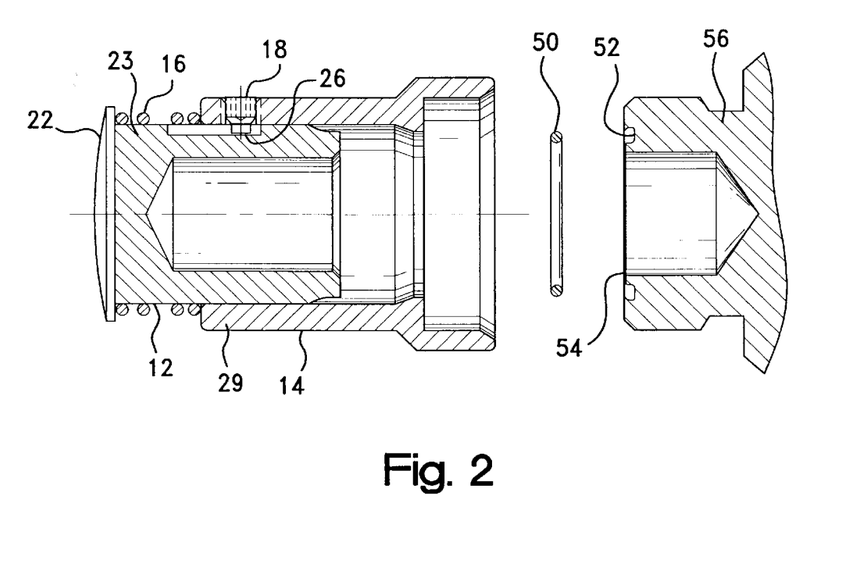
FIG. 2 is a cross-sectional side view of the assembly tool shown prior to insertion of the O-ring into a groove on the end surface of the fitting.

A radial bore 45 is provided in cylindrical body 29 toward the first end 31. Retaining pin 18 is received in bore 45 and projects into axial slot 26 in plunger 12 when the locator hub and plunger are assembled, as shown in FIG. 2. Retaining pin 18 can be held in bore 45 by conventional means such as threads, or by other means, such as by friction fit, solder, adhesive, etc.

Spring 16 is received around the cylindrical body portion 23 of plunger 12, and extends between the enlarged end wall 22 of plunger 12 and the rear end 31 of locator hub 14. Plunger 12 has an outside diameter which is closely received within the inside diameter of the cylindrical body 29 of locator hub 14 and which allows close sliding engagement therebetween. Retaining pin 18 allows axial movement of plunger 12 with respect to locator hub 14, but prevents relative rotational movement and unintentional disassembly of the plunger from the locator hub. Spring 16 provides a rearward bias on plunger 12 such that the plunger is normally located in the position shown in FIG. 2. In this position, retaining pin 18 preferably engages the forward end of slot 26 and prevents plunger 12 from being removed from locator hub 14.

Plunger 12, locator hub 14 and spring 16 can be formed of any appropriate material, for example metal or high-strength plastic, using conventional forming techniques which should be well known to those skilled in the art. Compression spring 16 and retaining pin 18 are likewise formed from similar metal or plastic material.

The assembly tool is designed to locate an O-ring 50, or a similar type of annular gasket, in a groove 52 formed in the flat end face 54 of fitting 56. As illustrated in FIG. 2, groove 52 is a half dove-tail groove where the radially-outer side wall of the groove is tapered inwardly toward the radially inner sidewall. Groove 52 could also be a conventional annular groove with equally spaced apart, cylindrical sidewalls. Tool 10 is believed generally inapplicable to full dove-tail type grooves, however, it is possible that there could be certain types of these fittings where the tool could be useful.

Figure 3:
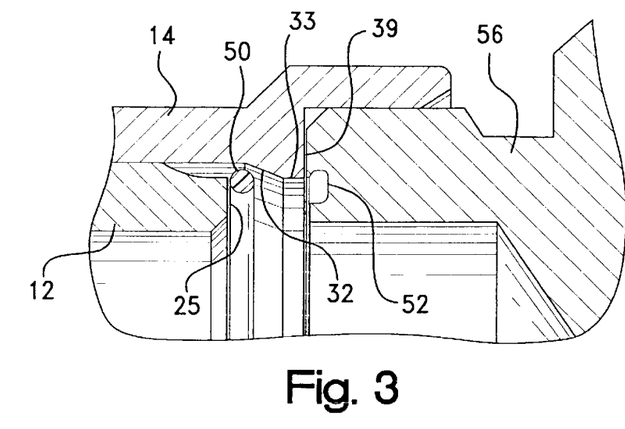
FIG. 3 is an enlarged cross-sectional side view of a portion of the assembly tool of FIG. 2.

Referring now to FIG. 3, O-ring 50 is initially located against the contact surface 25 at the forward end of plunger 12. The O-ring can be manually radially compressed slightly to fit the O-ring within the tapered forward end of the locator hub. The plunger is located rearwardly an amount sufficient to allow the O-ring to be located within the cylindrical body 23 of the locator hub, preferably at a location rearwardly of the tapered surface 32. O-ring 50 normally has an outside diameter about the same size as the inside diameter of the cylindrical body 29 of locator hub 14, so that the O-ring fits snugly within the locator hub.

Fitting 56 is then inserted into the enlarged end 35 of locator hub 14. The tapered forward surface 43 (FIG. 1) of the locator hub facilitates inserting the fitting 56 easily into the enlarged end 35. The cylindrical walls 37 of the enlarged end are sized to closely receive the outer diameter of the fitting (i.e, the threads on the fitting), and hence locate the assembly tool radially with respect to the fitting. The flat end wall 39 of the enlarged end engages the flat end face 54 of the fitting to locate the assembly tool axially with respect to the fitting. As shown, the inner diameter of the cylindrical end wall 39 of locator hub 14 at the forward end 33 generally corresponds to and is preferably slightly less than the outer diameter of the groove 52, at least at the opening to the groove.

Figure 4:
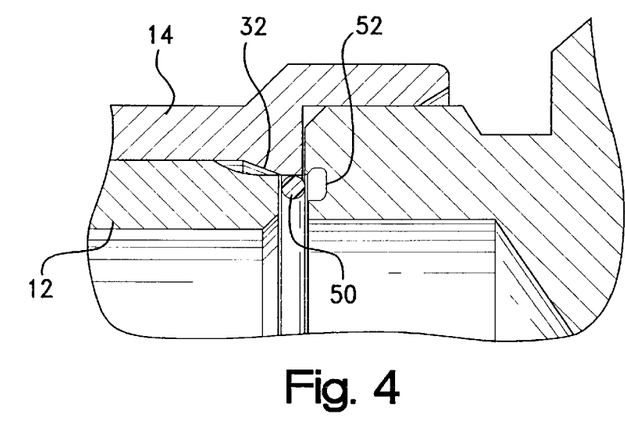
FIG. 4 is an enlarged cross-sectional side view similar to FIG. 3, showing the plunger moved toward its forward position relative to the locator hub.

Referring now to FIG. 4, the end wall 22 (FIG. 2) of the plunger 12 is pushed against the spring bias such that plunger moves the O-ring forwardly along the locator hub 14. As can be seen, O-ring 50 is radially-inwardly compressed as the O-ring rides against the tapered surface 32 of locator hub 14. The O-ring is compressed to the extent that it will fit cleanly into groove 52 without catching (and possibly ripping, tearing, etc.) on the outer sidewall of the groove. The contact surface 25 of the plunger also maintains a constant, even pressure around O-ring 50, which maintains the O-ring in a proper orientation for insertion, and also prevents damage to the ring by the inside surface of the locator hub as well as by the sidewalls of the groove. Retaining pin 18 (FIG. 2) also prevents damage to the ring 50 by permitting only axial movement of plunger 12 with respect to locator hub 14.

Figure 5:
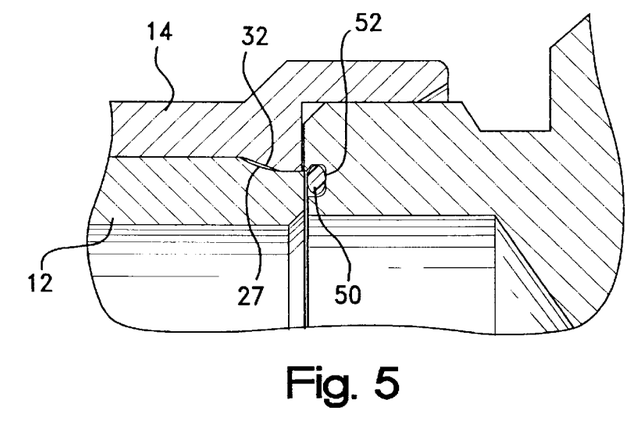
FIG. 5 is an enlarged cross-sectional side view similar to FIG. 4, showing the plunger in its forward-most position with the O-ring located within the groove on the end face of the fitting.

Referring now to FIG. 5, plunger 12 is in its maximum forward position, where O-ring 50 is filly inserted into groove 52, and cleanly passes over the outer sidewall of the half dove-tail groove and then radially expands into the full dimension of the groove. The opposite tapered surfaces 27, 32 of the plunger and locator hub, respectively, are in surface-to-surface contact to prevent further forward movement of plunger 12. The outer diameter of the forward end 25 of the plunger is also shown to be substantially the same as the inner diameter of the forward end 33 of the locator hub. When the plunger is released, locator hub 14 moves back to the position shown in FIG. 2 by virtue of compression spring 16, with the O-ring 50 staying within groove 52.

The assembly tool is then removed from fitting 56 and the fitting can then be further assembled into whatever application is needed. The principles of operation of the tool to dispense O-rings into annular grooves is the same as with half-dovetail grooves.

The dimensions of plunger 12 and locator hub 14 can obviously vary depending upon the particular application, with the enlarged receiving end 35 of locator hub 14 preferably always closely receiving the fitting to properly orient the assembly tool with respect to the fitting. Since the location of the groove in a face-seal type fitting is usually closely controlled with respect to the threads of the fitting, the use of the outer diameter to locate the assembly tool allows very accurate positioning of the O-ring within the groove.

Figure 6:
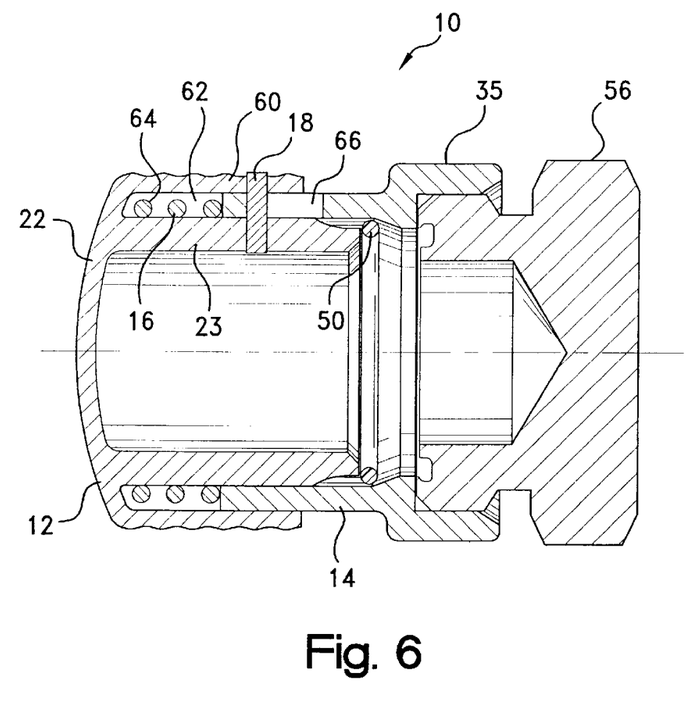
FIG. 6 is a cross-sectional side view of another form of the assembly tool shown prior to insertion of the O-ring into a groove on the end surface of the fitting.
Figure 7:
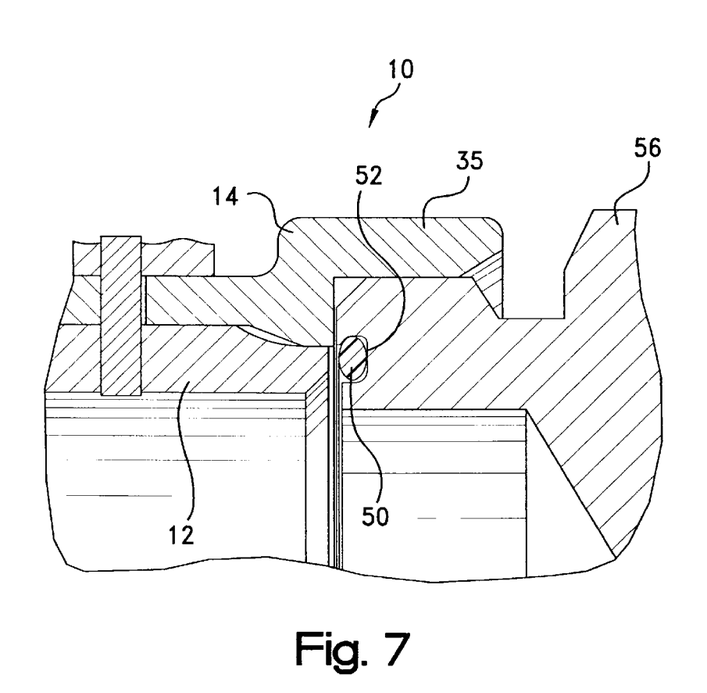
FIG. 7 is an enlarged cross-sectional side view similar to FIG. 6, showing the plunger in its forward-most position with the O-ring located within the groove on the end face of the fitting.

Referring now to FIGS. 6 and 7, a further form of the assembly tool 10 of the present invention is shown. In this form, plunger 12 includes an outer cylindrical sleeve 60, which surrounds and encloses spring 16. The inner surface of sleeve 60 and the outer surface of cylindrical body 23 define a forwardly-opening annular cavity, indicated at 62, for spring 16. Cavity 62 includes an inner annular end wall 64, formed by plunger end wall 22, which interconnects the opposing sidewalls of the sleeve and cylindrical body. The inner surface of outer sleeve 60 and the outer surface of inner cylindrical body 23 are preferably smooth and extend substantially parallel to one another, while end wall 64 extends substantially perpendicular to sleeve 60 and body 23. The outer surface of sleeve 60 can be knurled or ribbed to facilitate grasping by the user.

This form of the invention is particularly suited for a plunger formed from plastic, which can be easily formed to provide the inner and outer cylindrical walls of plunger 12.

As can be seen in FIG. 6, spring 16 is located within cavity 62 between end wall 64 of plunger 12 and the rear end 31 of locator hub 14 to bias plunger 12 into its rearward position. The locator hub fits closely between sleeve 60 and cylindrical body 23. In this form, retaining pin 18 can be located within a bore formed in both cylindrical body 23 and sleeve 60, and slide within an axial slot 66 formed within locator hub 14. Again, pin 18 prevents relative rotation of plunger 12 with respect to locator hub 14, as well as prevents the removal of the locator hub 14 from plunger 12.

The other aspects of assembly tool 10 are the same in this form as with the form described above with respect to FIGS. 1–5, and will not be described herein again for sake of brevity. After O-ring 50 is located within locator hub 14 and fitting 56 is received within the enlarged end 35 of the locator hub, plunger 12 is pushed forwardly to locate O-ring 50 within groove 52 as shown in FIG. 7. Again, the enlarged end 35 of the locator hub properly locates the fitting both radially and axially within the assembly tool for easy operation of the tool and to prevent damage to the O-ring.

Figure 8:
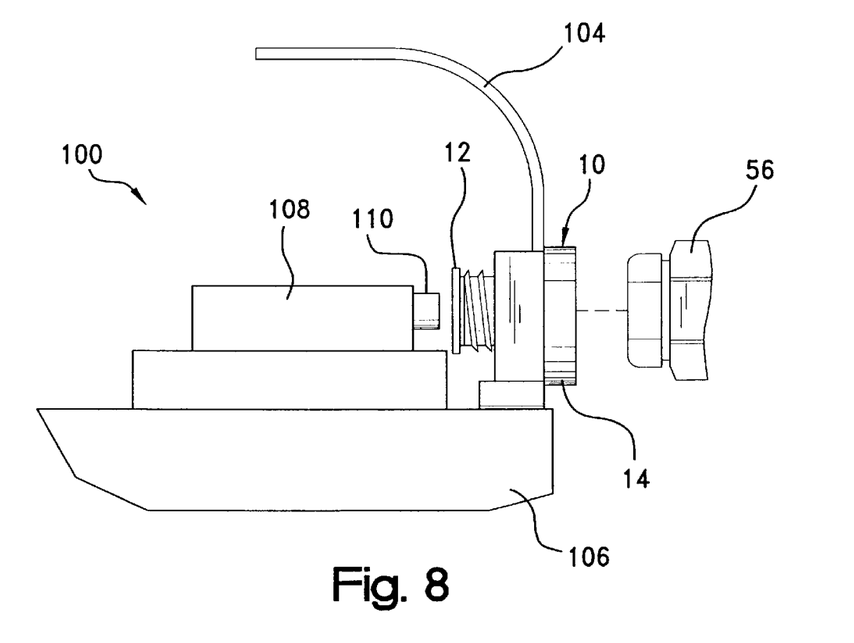
FIG. 8 is a side view of an automated system for the assembly tool of the present invention.
Figure 9:
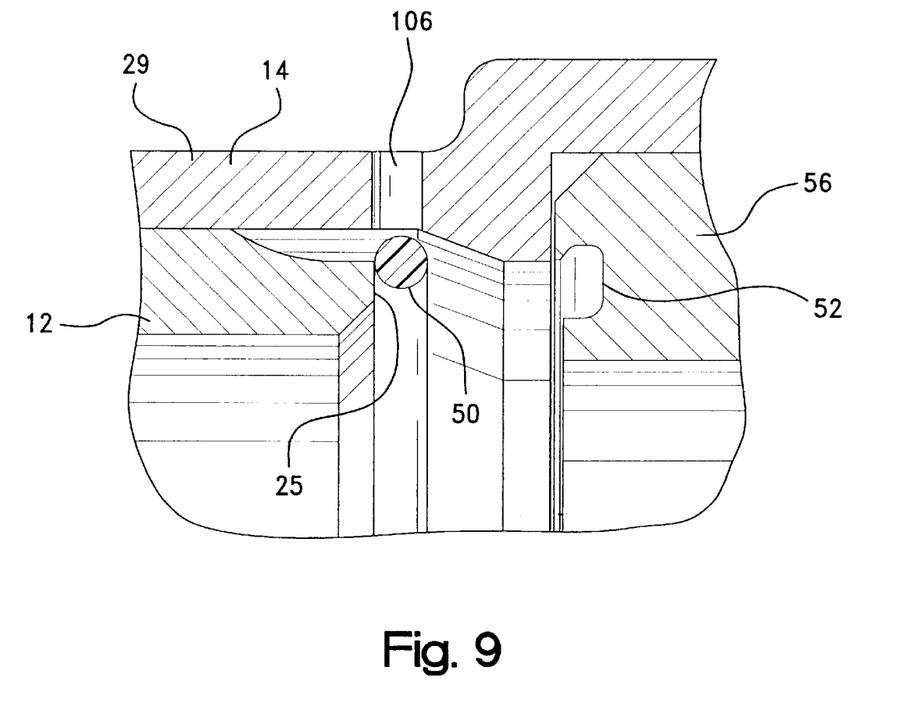
FIG. 9 is an enlarged cross-sectional side view similar to FIG. 2, but showing a further form of the assembly tool for the automated system of FIG. 8.

The assembly tool 10 can be used in an automated process line where an automatic feed provides O-rings in succession to a series of assembly tools, and the O-rings are automatically located within the grooves in successive fittings. In this case, referring now to FIGS. 8 and 9, a machine to automatically assemble O-rings in a groove in the end face of a succession of fittings is indicated generally at 100. The machine 100 includes assembly tool 10 and an automatic feed device 104. Automatic feed device 104 provides O-rings in succession to assembly tool 10 when a fitting 56 is present in a proper orientation with respect to tool 10. Assembly tool 10 is preferably the same tool as described above with respect to FIGS. 1–5, with the following exception. Referring specifically to FIG. 9, an arcuate slot 106 is provided around a portion of the cylindrical body 29 of locator hub 14 at a point forwardly of the forward end 25 of plunger 12. Arcuate slot 106 provides access to the central cavity of the locator hub, and allows an O-ring to be fed radially inward into the central cavity at a location in front of the plunger 12. The O-ring can be slightly compressed by the automatic feed device to fit within the slot 104, and then allowed to expand into it normal dimension within the locator hub.

The assembly tool 10 can be located on stand 106. An air piston or lever device 108 is also mounted on stand 106 and includes a piston or cylinder 110 which can be activated to automatically push plunger 12 forwardly into locator hub 14, and hence push O-ring 50 forwardly into groove 52. Any other appropriate automated device could also be used to push plunger 12 forwardly. The piston 110 of air piston 108 could also be formed in one piece with plunger 12. An arrangement of assembly tools can be supported on a rotating carousel (not shown) and brought into alignment with successive fittings. The tools can even have different sizes, to assemble O-rings of different sizes onto appropriate fittings. The automatic feed device, air piston 108 and carousel can be operated in an automated manner using conventional computer controls. In this manner, O-rings can be easily located in fittings in an efficient manner.

Thus, as described above, the present invention provides a new and unique assembly tool for locating an O-ring within the groove in an end surface of a fitting. The assembly tool is of simple construction, is easy to operate, and provides for quickly and consistently positioning an O-ring within a groove without damaging the O-ring.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An O-ring assembly tool for locating an O-ring in a groove in an end face of a fitting, the assembly tool comprising:

a plunger having a cylindrical body with a contact surface at a forward end of the plunger said cylindrical body of the plunger including an outer surface portion at a forward end of the plunger body which tapers radially inward toward the central axis of the tool, a locator hub having a cylindrical body closely surrounding the cylindrical body of the plunger and in adjacent axially sliding relationship therewith, said locator hub including a radially- enlarged receiving end at a forward end of the locator hub body for receiving the fitting with an annular end wall outwardly bounding and extending radially outward from the locator hub body for engaging the end face of the fitting, and a cylindrical sidewall outwardly bounding and projecting axially forwardly from the end wall for outwardly surrounding the fitting, said locator hub further including an inner surface portion at a forward end of the locator hub body which tapers radially inward toward the central axis of the tool and forwardly toward the annular end wall of the receiving end, with the cylindrical sidewall of the receiving end extending axially forward of the tapered inner surface portion;

a biasing device normally biasing said plunger into a first position where the plunger contact surface is spaced rearwardly of said receiving end an amount sufficient to locate an O-ring within the cylindrical body of the locator hub at the forward contact surface of the plunger, and allowing forward axial movement of the plunger with respect to said locator hub into a second position to move the plunger contact surface toward the receiving end to dispense the O-ring from the tool, said tapered outer surface portion of the plunger corresponding substantially to the tapered inner surface portion of the locator hub such that when said locator hub is in said second position, the tapered surface portions are in adjacent, surface-to-surface contact with one another to prevent the plunger from moving axially forward beyond the point where the contact surface of the plunger is generally flush with the end wall of the receiving end.

2. The tool as in claim 1, wherein said plunger has a cup-shaped body with an end wall enclosing a rear end of the plunger.

3. The tool as in claim 1, wherein the annular end wall of the enlarged receiving end of the locator hub is flat and the cylindrical sidewall has a smooth continuous inner surface extending outwardly from the outer periphery of the annular end wall.

4. The tool as in claim 1, wherein the sidewall of the enlarged receiving end of the locator hub includes an inner annular surface portion tapering radially outward toward the distal annular end of the sidewall.

5. The tool as in claim 1, wherein the plunger includes an outer cylindrical sleeve and an inner annular end wall interconnecting the sleeve with the cylindrical body of the plunger, and together with the sleeve and plunger body defining an annular cavity having an open annular end, the locator hub being closely slidably received in the annular cavity through the open annular end, and further including a spring disposed in the cavity and extending between the end wall and a rear end surface of the locator hub for biasing the locator hub outwardly from the cavity.

6. The tool as in claim 1, further including a device to prevent relative rotation of said locator hub with respect to said plunger.

7. The tool as in claim 6, wherein said cylindrical body of said plunger includes an axially-extending slot and said cylindrical body of said locator hub includes a radial bore, and the device to prevent rotation of said locator hub with respect to said plunger includes a retaining pin extending through said bore and into said slot to axially guide said plunger with respect to said locator hub.

8. The tool as in claim 6, wherein said cylindrical body of said locator hub includes an axially-extending slot and said cylindrical body of said plunger includes a radial bore, and the device to prevent rotation of said locator hub with respect to said plunger includes a retaining pin extending through said bore and into said slot to axially guide said plunger with respect to said locator hub.

9. The tool as in claim 1, further including means to prevent the plunger from moving axially forward beyond the point where the contact surface of the plunger is generally flush with the end wall of the receiving end.

10. An O-ring assembly tool for locating an O-ring in a groove in an end face of a fitting, the assembly tool comprising:

a plunger having a cylindrical body with an annular contact surface at a forward end of the plunger;

a locator hub having a cylindrical body closely surrounding the cylindrical body of the plunger in adjacent sliding relationship therewith, said locator hub including a radially-enlarged receiving end at a forward end of the locator hub body for receiving the fitting with an annular flat end wall outwardly bounding and extending radially outward from the body of the locator hub for engaging the end face of the fitting and a cylindrical sidewall outwardly bounding and projecting axially forward from the end wall for outwardly surrounding the fitting, said cylindrical sidewall having a smooth continuous inner surface extending outwardly from the outer periphery of the annular end wall;

a device to prevent relative rotation of said locator hub with respect to said plunger; and a biasing device normally biasing said plunger into a first position where the plunger contact surface is spaced rearwardly of said receiving end an amount sufficient to locate an O-ring within the cylindrical body of the locator hub at the forward contact surface of the plunger, and allowing forward axial movement of the plunger with respect to said locator hub into a second position to move the plunger contact surface toward the receiving end to dispense the O-ring from the tool, and wherein said cylindrical body of the plunger includes an outer surface portion at a forward end of the plunger body which tapers radially inward toward the central axis of the tool, and said cylindrical body of the locator hub includes an inner surface portion at a forward end of the locator hub body which also tapers radially inward toward the central axis of the tool and forwardly toward the annular end wall of the receiving end, with the cylindrical sidewall of the receiving end extending axially forward of the tapered inner surface portion, said tapered outer surface portion of the plunger corresponding substantially to the tapered inner surface portion of the locator hub such that when said locator hub is in said second position, the tapered surface portions are in adjacent, surface-to-surface contact with one another to prevent the plunger from moving axially forward beyond the point where the contact surface of the plunger is generally flush with the end wall of the receiving end.

11. The tool as in claim 10, wherein the plunger includes an outer cylindrical sleeve and an inner annular end wall interconnecting the sleeve with the cylindrical body of the plunger, and together with the sleeve and plunger body defining an annular cavity having an open annular end, the locator hub being closely slidably received in the annular cavity through the open annular end, and further including a spring disposed in the cavity and extending between the end wall and a rear end surface of the locator hub for biasing the locator hub outwardly from the cavity.

12. An O-ring assembly tool for locating an O-ring in a groove in an end face of a fitting, the assembly tool comprising:

a plunger having a cylindrical body with an annular contact surface at a forward end of the plunger, said plunger also having an outer cylindrical sleeve and an inner annular end wall interconnecting an end of the inner body and the outer sleeve and together with the body and sleeve defining an annular cavity having an open end;

a locator hub having a cylindrical body closely and slidably received in the annular cavity of the plunger through the open end, said locator hub including a radially-enlarged receiving end at a forward end of the locator hub body which can receive the fitting with an annular end wall outwardly bounding and extending radially outward from the locator hub body to engage the end face of the fitting and a cylindrical sidewall outwardly bounding and projecting axially forwardly from the end wall to outwardly surround the fitting;

a device to prevent relative rotation of said locator hub with respect to said plunger; and a spring disposed in the cavity of the plunger and extending between the end wall of the annular cavity and a rear end surface of the locator hub for biasing the locator hub outwardly from the cavity into a first position where the plunger contact surface is spaced rearwardly of said receiving end an amount sufficient to locate an O-ring within the cylindrical body of the locator hub at the forward contact surface of the plunger, and allowing forward axial movement of the plunger with respect to said locator hub into a second position to move the plunger contact surface toward the receiving end to dispense the O-ring from the tool, said locator hub of said assembly tool including an inner surface portion at a forward end of the locator hub body which tapers radially inward toward the central axis of the tool and forwardly toward the annular end wall of the receiving end, with the cylindrical sidewall of the receiving end extending axially forward of the tapered surface portion, and said cylindrical body of the plunger including an outer surface portion at a forward end of the plunger body which tapers radially inward toward the central axis of the tool, said tapered outer surface portion of the plunger corresponding substantially to the tapered inner surface portion of the locator hub such that when said locator hub is in said second position, the tapered surface portions are in adjacent, surface-to-surface contact with one another to prevent the plunger from moving axially forward beyond the point where the contact surface of the plunger is generally flush with the end wall of the receiving end.

13. The tool as in claim 12, further including means to prevent the plunger from moving axially forward beyond the point where the contact surface of the plunger is generally flush with the end wall of the receiving end.

14. An O-ring assembly tool for locating an O-ring within an annular dove-tail groove formed in an end surface of a fitting, comprising:

a plunger having a cylindrical body with an annular contact surface at a forward end of the plunger for engagement with the O-ring;

a locator hub having a cylindrical body closely surrounding the cylindrical body of the plunger and in adjacent axially sliding relationship therewith, said locator hub including a radially- enlarged receiving end at a forward end of the locator hub body with an annular end wall outwardly bounding and extending radially outward from the locator hub body to engage the end surface of the fitting, and a cylindrical sidewall outwardly bounding and projecting axially forwardly from the end wall to closely receive an outer diameter of the fitting;

a biasing device normally biasing said plunger into a first position where the plunger contact surface is spaced rearwardly of said receiving end an amount sufficient to locate the O-ring within the cylindrical body of the locator hub at the forward contact surface of the plunger, and allowing forward axial movement of the plunger with respect to said locator hub into a second position to move the plunger contact surface toward the receiving end to dispense the O-ring from the tool into the groove in the fitting, said plunger including an outer surface portion at a forward end of the plunger body which tapers radially inward toward the central axis of the tool, and said cylindrical body of the locator hub including an inner surface portion at a forward end of the locator hub body which also tapers radially inward toward the central axis of the tool and forwardly toward the annular end wall of the receiving end, with the cylindrical sidewall of the receiving end extending axially forward of the tapered inner surface portion, said tapered outer surface portion of the plunger corresponding substantially to the tapered inner surface portion of the locator hub such that when said locator hub is in said second position, the tapered surface portions are in adjacent, surface-to-surface contact with one another to prevent the plunger from moving axially forward beyond the point where the contact surface of the plunger is generally flush with the end wall of the receiving end.

15. The tool as in claim 14, wherein said plunger has a cup-shaped body with an end wall enclosing a rear end of the plunger.

16. The tool as in claim 14, wherein the annular end wall of the enlarged receiving end of the locator hub is flat and the cylindrical sidewall has a smooth continuous inner surface extending outwardly from the outer periphery of the annular end wall.

17. The tool as in claim 14, wherein the sidewall of the enlarged receiving end of the locator hub includes an inner annular surface portion tapering radially outward toward the distal annular end of the sidewall.

18. The tool as in claim 14, wherein the plunger includes an outer cylindrical sleeve and an inner annular end wall interconnecting the sleeve with the cylindrical body of the plunger, and together with the sleeve and plunger body defining an annular cavity having an open annular end, the locator hub being closely slidably received in the annular cavity through the open annular end, and further including a spring disposed in the cavity and extending between the end wall and a rear end surface of the locator hub for biasing the locator hub outwardly from the cavity.

19. The tool as in claim 14, further including a device to prevent relative rotation of said locator hub with respect to said plunger.

20. The tool as in claim 19, wherein said cylindrical body of said plunger includes an axially-extending slot and said cylindrical body of said locator hub includes a radial bore, and the device to prevent rotation of said locator hub with respect to said plunger includes a retaining pin extending through said bore e and into said slot to axially guide said plunger with respect to said locator hub.

21. The tool as in claim 19, wherein said cylindrical body of said locator hub includes an axially-extending slot and said cylindrical body of said plunger includes a radial bore, and the device to prevent rotation of said locator hub with respect to said plunger includes a retaining pin extending through said bore and into said slot to axially guide said plunger with respect to said locator hub.

22. The tool as in claim 14, further including means to prevent the plunger from moving axially forward beyond the point where the contact surface of the plunger is generally flush with the end wall of the receiving end.

23. A machine for assembling O-rings within an annular dove-tail groove formed in an end surface of a fitting, comprising:

an O-ring assembly tool supported on a stands said O-ring assembly tool including a plunger having a cylindrical body with an annular contact surface at a forward end of the plunger for engagement with the O-ring;

a locator hub having a cylindrical body closely surrounding the cylindrical body of the plunger and in adjacent axially sliding relationship therewith, said locator hub including a radially-enlarged receiving end at a forward end of the locator hub body with an annular end wall outwardly bounding and extending radially outward from the locator hub body to engage an end surface of the fitting, and a cylindrical sidewall outwardly bounding and projecting axially forwardly from the end wall to closely receive an outer diameter of the fitting, and the cylindrical body of the locator hub having an arcuate opening into the interior of the locator hub; and a biasing device normally biasing said plunger into a first position where the plunger contact surface is spaced rearwardly of said receiving end an amount sufficient to insert the O-ring through the arcuate opening and locate the O-ring within the cylindrical body of the locator hub at the forward contact surface of the plunger, and allowing forward axial movement of the plunger with respect to said locator hub into a second position to move the plunger contact surface toward the receiving end to dispense the O-ring from the tool;

a feeder for feeding a plurality of O-rings in succession to the assembly tool, said feeder directing the O-rings through the arcuate slot in the locator hub body and into the locator hub against the forward contact surface of the plunger; and means for moving said plunger from said first position to said second position to dispense said O-ring into the groove in the fitting, said locator hub of said assembly tool including an inner surface portion at a forward end of the locator hub body which tapers radially inward toward the central axis of the tool and forwardly toward the annular end wall of the receiving end, with the cylindrical sidewall of the receiving end extending axially forward of the tapered surface portion, and said cylindrical body of the plunger including an outer surface portion at a forward end of the plunger body which tapers radially inward toward the central axis of the tool, said tapered outer surface portion of the plunger corresponding substantially to the tapered inner surface portion of the locator hub such that when said locator hub is moved into said second position, the tapered surface portions come in adjacent, surface-to-surface contact with one another to prevent the plunger from moving axially forward beyond the point where the contact surface of the plunger is generally flush with the end wall of the receiving end.

24. The machine as in claim 23, further including means to prevent the plunger from moving axially forward beyond the point where the contact surface of the plunger is generally flush with the end wall of the receiving end.

* * * * *